(12) United States Patent
Gidseg et al.

(10) Patent No.: US 8,184,272 B2
(45) Date of Patent: May 22, 2012

(54) SYSTEM AND METHOD FOR TRANSITIONING FROM A MISSILE WARNING SYSTEM TO A FINE TRACKING SYSTEM IN A DIRECTIONAL INFRARED COUNTERMEASURES SYSTEM

(75) Inventors: Ronald A. Gidseg, Pasadena, CA (US); John A. Carattini, Chino Hills, CA (US); Phong V. Ha, Chino Hills, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 13/027,678

(22) Filed: Feb. 15, 2011

(65) Prior Publication Data

US 2011/0142285 A1   Jun. 16, 2011

Related U.S. Application Data

(62) Division of application No. 12/764,450, filed on Apr. 21, 2010, now Pat. No. 8,023,107, which is a division of application No. 10/593,358, filed as application No. PCT/US2005/018689 on May 26, 2005, now Pat. No. 7,733,465.

(60) Provisional application No. 60/574,603, filed on May 26, 2004.

(51) Int. Cl.
*G01P 3/36* (2006.01)

(52) U.S. Cl. ....... 356/29; 356/28; 356/28.5; 356/139.04
(58) Field of Classification Search ............. 356/29, 356/139.04; 382/103, 106
See application file for complete search history.

(56) References Cited

U.S. PATENT DOCUMENTS

| | | | |
|---|---|---|---|
| 5,371,542 | A | 12/1994 | Pauli et al. |
| 5,389,790 | A | 2/1995 | Honey et al. |
| 5,638,164 | A | 6/1997 | Landau |
| 5,644,386 | A | 7/1997 | Jenkins et al. |
| 5,793,889 | A | 8/1998 | Bushman |

(Continued)

FOREIGN PATENT DOCUMENTS

GB   2430574 A   3/2007

(Continued)

OTHER PUBLICATIONS

International Search Report Dated Feb. 1, 2007, for International Patent Application No. PCT/US2005/018689 Filed May 26, 2005.

*Primary Examiner* — Luke Ratcliffe
(74) *Attorney, Agent, or Firm* — Graybeal Jackson LLP; Paul F. Rusyn; Daniel J. Long

(57) ABSTRACT

A method for transitioning a target from a missile warning system to a fine tracking system in a directional countermeasures system includes capturing at least one image within a field of view of the missile warning system. The method further includes identifying a threat from the captured image or images and identifying features surrounding the threat. These features are registered with the threat and image within a field of view of the fine tracking system is captured. The registered features are used to identify a location of a threat within this captured image.

13 Claims, 6 Drawing Sheets

U.S. PATENT DOCUMENTS

| | | | |
|---|---|---|---|
| 5,831,724 A | 11/1998 | Cordes | |
| 5,999,652 A | 12/1999 | Bushman | |
| 6,005,609 A | 12/1999 | Cheong | |
| 6,072,889 A | 6/2000 | Deaett et al. | |
| 6,137,566 A | 10/2000 | Leonard et al. | |
| 6,259,803 B1 * | 7/2001 | Wirtz et al. | 382/103 |
| 6,292,592 B1 | 9/2001 | Braunreiter et al. | |
| 6,298,143 B1 | 10/2001 | Kikuchi et al. | |
| 6,330,373 B1 | 12/2001 | McKinney et al. | |
| 6,507,660 B1 * | 1/2003 | Wirtz et al. | 382/103 |
| 6,697,010 B1 | 2/2004 | Lam | |
| 7,023,376 B1 | 4/2006 | Kuroda et al. | |
| 7,064,810 B2 * | 6/2006 | Anderson et al. | 356/5.01 |
| 7,219,853 B2 | 5/2007 | Williams | |
| 7,733,465 B2 | 6/2010 | Gidseg et al. | |
| 2003/0206663 A1 | 11/2003 | Daly | |
| 2004/0005082 A1 | 1/2004 | Lee et al. | |
| 2004/0095492 A1 | 5/2004 | Baxter et al. | |
| 2008/0049975 A1 * | 2/2008 | Stiegler | 382/104 |
| 2009/0304230 A1 * | 12/2009 | Krahnstoever et al. | 382/103 |

FOREIGN PATENT DOCUMENTS

| | | |
|---|---|---|
| GB | 2430574 B | 5/2010 |
| JP | 2010230870 A * | 10/2010 |

* cited by examiner

SYSTEM AND METHOD FOR TRANSITIONING FROM A MISSILE WARNING SYSTEM TO A FINE TRACKING SYSTEM IN A DIRECTIONAL INFRARED COUNTERMEASURES SYSTEM

PRIORITY CLAIM

The present application is a Divisional of U.S. patent application Ser. No. 12/764,450 filed on 21 Apr. 2010; which application is a Divisional of U.S. patent application Ser. No. 10/593,358 filed on 19 Sep. 2006, now U.S. Pat. No. 7,733,465 issued on 8 Jun. 2010; which application is a national phase application filed pursuant to 35 USC §371 of International Patent Application No. PCT/US2005/018689 filed on 26 May 2005; which application claims the benefit of U.S. Provisional Patent Application No. 60/574,603 filed on 26 May 2004, now expired; all of the foregoing applications are incorporated herein by reference in their entireties.

TECHNICAL FIELD

Embodiments of the present invention relate generally to countermeasures systems and methods, and more specifically to directional infrared countermeasures systems and methods.

BACKGROUND

A threat launch detection system is a system that detects a weapon being directed at a target, with the target typically containing the threat launch detection system. In response to detecting a weapon directed at the target, which will be referred to as a threat or event throughout the present description, the threat launch detection system typically takes countermeasures to prevent the weapon from impacting the target. For example, an airplane may include a threat launch detection system designed to detect missiles fired at the airplane. When the system detects a missile, the system typically takes appropriate countermeasures in an attempt to prevent the missile from impacting the airplane, such as transmitting a signal to "jam" electronic circuitry in the missile that is guiding the missile towards the target.

A conventional threat launch detection system is illustrated in FIG. 1, which more specifically depicts a block diagram of a directional infrared countermeasures (DIRCM) system 100. The system 100 includes a missile warning system 102 that detects the presence of weapon or threat 104 directed at an airplane or other vehicle (not shown) containing the DIRCM system. In the example of FIG. 1, the threat 104 is a missile that has been fired at the airplane containing the DIRCM system 100. The missile 104 includes a guidance system (not shown) for sensing infrared energy emitted by the airplane and for directing the missile towards the airplane.

The missile warning system 102 is typically a passive system that includes a sensor array (not shown) in combination with suitable optics (not shown) to provide a relatively wide field of view WFOV for missiles 104. The wide field of view WFOV is the region of space surrounding the system 100 in which missiles 104 can be detected. The sensor array in the missile warning system 102 is typically an array of infrared (IR) sensors that capture a series of images within the field of view WFOV. Processing circuitry (not shown) in the missile warning system 102 analyzes the captured images to detect a threat and generates a coarse directional determination indicating an arrival angle at which the missile or other threat 104 is approaching an airplane containing the system 100.

The missile warning system 102 provides this determined arrival angle to a system controller 106 which, in response to the determined angle, applies signals to a fine tracking system 108 to begin positioning a fine track sensor (not shown) toward the target at the determined angle. More specifically, this fine track sensor in the system 108 is typically mounted on a gimbal (not shown) that rotates in response to the signals from the system controller 106 to direct the fine track sensor towards the determined angle and thereby toward the approaching missile 104. The fine track sensor has a narrow field of view NVOV that is much smaller than the wide field of view WFOV to allow the fine tracking system 108 to precisely track the missile 104 or other threat positioned within the narrow field of view.

The fine tracking system 108 further includes a jamming laser (not shown) that is also directed towards the missile 104 by the rotating gimbal. Once the gimbal has positioned the fine track sensor and jamming laser towards the missile 104, the jamming laser is turned on and infrared laser energy from the laser illuminates the approaching threat 104 missile. This infrared laser energy is modulated in such a way that the when the guidance system in the missile 104 senses this energy the guidance system directs the missile away from the airplane. The fine tracking sensor in the fine tracking system 108 senses the position of the missile 104 during this time to accurately illuminate the missile 104 with energy from the jamming laser.

The process of providing the determined angle of the approaching missile 104 to the fine tracking system 108 via the controller 106 and subsequent positioning of the fine track sensor and jamming laser may be referred to as a "handoff" or "transitioning" from the missile warning system to the fine tracking system. This is true since directional information from the missile warning system 102 is transitioning to the fine tracking system 106 to allow the fine tracking system to determine precise directional information for the missile 104 and thereby allow the jamming laser to successfully "jam" the guidance system of the missile. In this way, the fine tracking system 106 tracks the missile 104 and jams the guidance system of the missile. Note that typically the sensors in the missile warning and fine tracking systems 102 and 108 do not operate in the same waveband, with the missile warning system typically operating in the ultraviolet waveband the fine tracking system typically operating in the infrared waveband. This need not be the case and in the future the missile warning system 108 too may operate in the infrared waveband. Note that a fire from an engine propelling the missile 104 shows up in both the ultraviolet and infrared frequency spectrums or wavebands. Also note that due to the much larger field of view WFOV of the missile warning system 102 when compared to the field of view NFOV of the fine tracking system 108, the resolution of images captured by the missile warning system is much lower than the resolution of images captured by the fine tracking system.

Current missile warning systems 102 have sophisticated algorithms to analyze the series of captured images and distinguish true targets 104 from false ones or from clutter that is constantly being sensed due to background objects within the wide field of view WFOV. In this context, clutter may be viewed as data in each captured image that is other than data corresponding to the target or threat. The fine track sensor in the fine tracking system 108, however, is much less sophisticated and does not have historical record in the form of a series of captured images for the threat 104 within the narrow field of view NFOV. As a result, the fine tracking system 108 does not have a series of images to compare at handoff from the missile warning system 102. This means that while the missile warning system 102 may accurately determine the existence and arrival angle of the threat 104, the fine tracking system 108 may select a false threat or a clutter object within the narrow field of view NFOV. A false selection of a false threat or clutter object means the jamming laser in the fine tracking system 108 may not properly illuminate the approaching threat 104 and could lead to the threat not being properly countered. Certain systems 100 may have major issues with transitioning or handing off a threat 104 from the missile warning system 102 to the fine tracking system 108, particularly under conditions of high clutter or with low contrast targets.

The narrow field of view NFOV of the fine tracking system 108 is generally much greater than the effective divergence of the jamming laser in order to mitigate errors in arrival angle information that is transferred or handed off from the missile warning system 102. Such errors in arrival angle information can result from a variety of different factors, such as misalignment between sensors in the missile warning system 102 and fine tracking system 108. This misalignment can be static or be dynamic and due to such things as flexure of the airplane between the location of the missile warning system 102 and the fine tracking system 108. Non-linear characteristics across elements in the sensor array in the missile warning system 102 may also result in errors in arrival angle information.

There is a need for improved methods and systems for transitioning a threat from the a missile warning system to a fine tracking system in DIRCM systems, especially under conditions of high clutter or low contrast targets or threats.

SUMMARY

According to one embodiment of the present invention, a method for transitioning a target from a missile warning system to a fine tracking system in a directional countermeasures system includes capturing at least one image within a field of view of the missile warning system. The method further includes identifying a threat from the captured image or images and identifying features surrounding the threat. These features are registered with the threat and image within a field of view of the fine tracking system is captured. The registered features are used to identify a location of a threat within this captured image.

DETAILED DESCRIPTION

Figure 2:
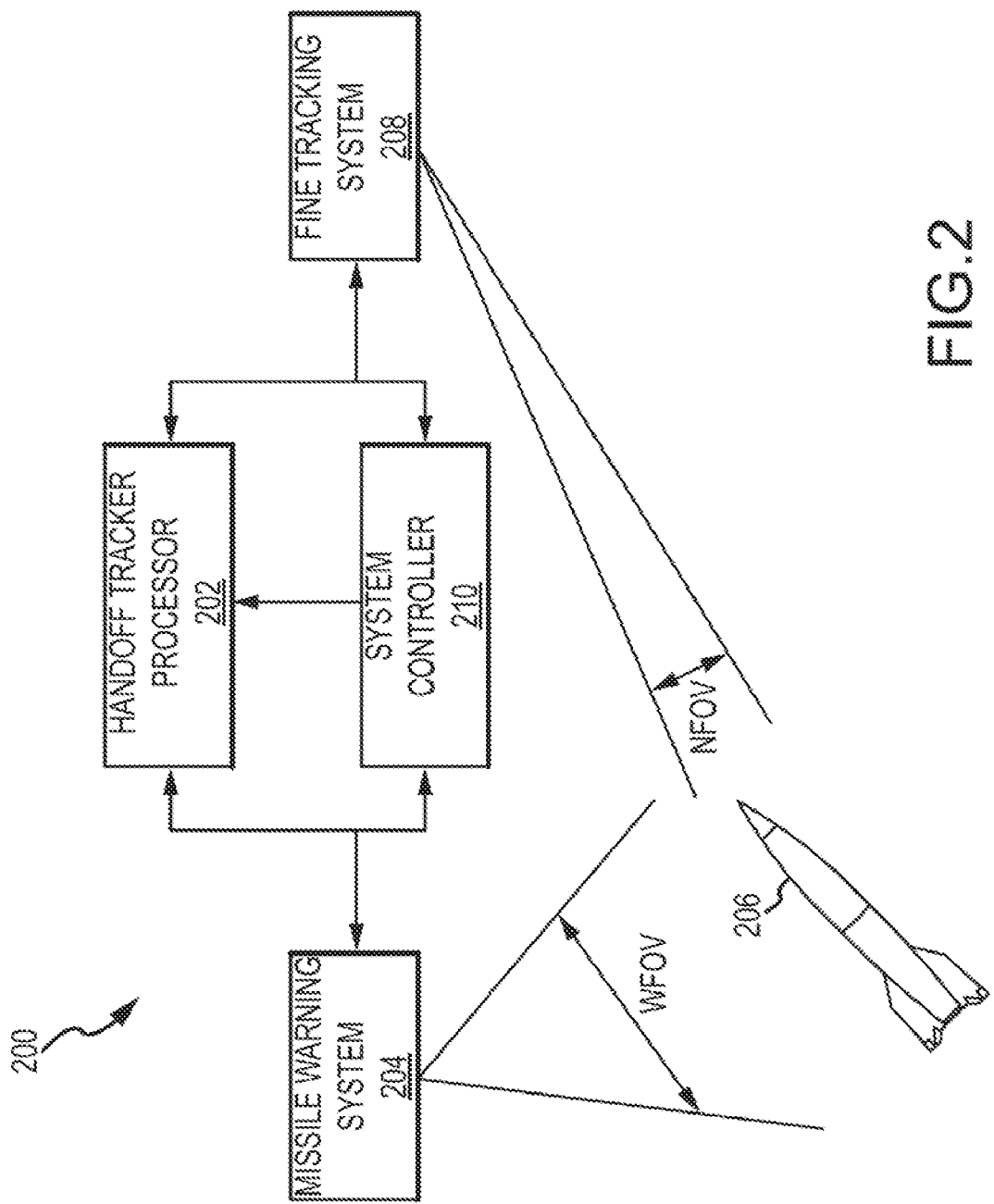
FIG. 2 is a functional block diagram of a directional infrared countermeasure system including a handoff tracker processor for more reliably transitioning a detected threat from a missile warning system to a fine tracking system.

FIG. 2 is a functional block diagram of a directional infrared countermeasures system 200 including a handoff tracker processor 202 that analyzes segments of an image or "subimages" captured by a missile warning system 204 to more reliably transition a detected threat 206 from the missile warning system to a fine tracking system 208. More specifically, the handoff tracker processor 202 processes subimages to identify and "register" features around a threat 206 and thereafter utilizes these registered features in combination with images captured by the missile warning system 204 and fine tracking system 208 to more precisely identify the location of the threat within an image from the fine tracking system, as will be explained in more detail below. In this way, the handoff tracker processor 202 works in combination with the missile warning system 204 and fine tracking system 208 to provide more accurate position information for threats 206 to the fine tracking system 208 to enable more reliable tracking and jamming of actual threats. These features registered by the handoff tracker processor 202 correspond to clutter features within the subimage and in this way utilize such clutter features as a way of increasing handoff accuracy rather than the opposite as is true in the conventional system 100, as will be described in more detail below.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well known components and/or processes has not been shown or described in detail below to avoid unnecessarily obscuring the present invention.

Figure 1:
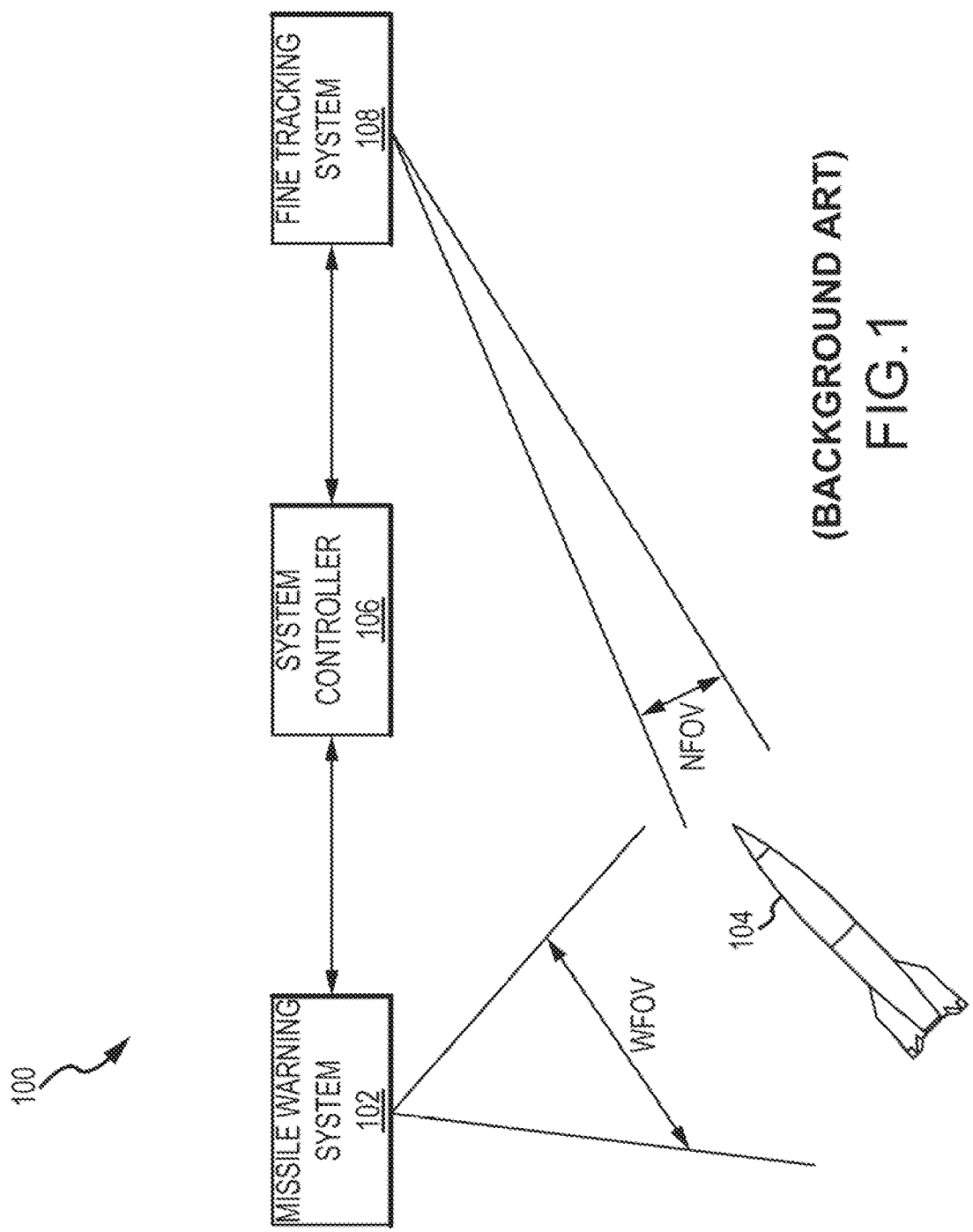
FIG. 1 is a functional block diagram illustrating the operation of a conventional directional infrared countermeasure system.

The missile warning system 204 operates in the same as described above for the system 102 of FIG. 1. Briefly, the missile warning system 204 includes a sensor array (not shown) in combination with suitable optics (not shown) to provide a relatively wide field of view WFOV for sensing a threat 206 within the field of view, with the threat being a missile in the example of FIG. 2. Processing circuitry (not shown) in the missile warning system 204 analyzes a series of captured images to detect a missile 206 and generates a coarse directional determination indicating an arrival angle at which the missile is approaching an airplane containing the system 200. Note that although depicted as a separate component in FIG. 2, the functionality performed by the handoff tracker processor 202 may also be done the fine tracking system 208, depending on utilization and speed issues with having the fine tracking system perform this function. Alternatively, the missile warning system 204 could also perform the functionality of the handoff tracker processor 202.

A system controller 210 receives the arrival angle determination from the missile warning system and utilizes this determination to calculate a time to intercept TSS of the detected missile 206. The system controller 210 thereafter applies signals to the fine tracking system 208 to begin positioning a fine track sensor (not shown) toward the missile 206 at the determined angle. More specifically, as discussed with reference to FIG. 1, this fine track sensor is typically mounted on a gimbal (not shown) that rotates in response to the signals (a slew command) from the system controller 210 to direct the fine track sensor towards the determined angle and thereby toward the approaching missile 206. The fine track sensor has a narrow field of view NVOV that is much smaller than the wide field of view WFOV as shown in FIG. 2, which allows the fine tracking system 208 to precisely track the missile 206 or other threat positioned within the narrow field of view.

The overall operation of the directional infrared countermeasures system 200 of FIG. 2 will now be described in more detail with reference to FIG. 3, which is a time sequence of events diagram illustrating the operation of the components in the system of FIG. 2. In the time sequence of events diagram of FIG. 3, time is moving forward vertically down the page as indicated by the label "Time" and the downward arrow in the upper left portion of the figure. Items at a given horizontal level in the figure occur at approximately the same time. Thus, for example, in the vertical column on the far left under the label "Missile Warning System Images", each of the boxes 1-7 represents and image captured by the missile warning system 204. This vertical column labeled illustrates that the missile warning system 204 is constantly acquiring and processing images.

A second vertical column labeled "Handoff Tracker Processor" shows operation of the handoff tracker processor 202 of FIG. 2 as time progress. A third vertical column labeled "System Controller" shows the operation of the system controller 210 while a fourth column labeled "Fine Tracking System" shows the operation of the fine tracking system 208. In addition to the functionality discussed above, the fine tracking system 208 performs additional functions as illustrated in this column, such as non-uniformity correction and other image manipulation before the image is further processed, as will be described in more detail below.

In operation, an engagement of the system 200 starts the missile warning system 204 identifying a threat 206 within the wide field of view WFOV. This identification process typically utilizes multiple images or frames captured by the missile warning system 204 along with history data of brightness over time. The missile warning system 204 utilizes these multiple images to identify threats 206 in various clutter situations and allow the missile warning system to identify threats with far great precision than is possible from only a single image, as will be appreciated by those skilled in the art.

Once the missile warning system 204 has identified a threat 206, the missile warning system provides angle of arrival information to the system controller 210. In FIG. 3, this occurs in image 3 under the MWS Images column, as indicated by the text "Target Identified" and arrow to the left of this image. The system controller 210 receives the angle of arrival information as indicated by an arrow 300 and calculates an intercept to the target angle and a time to intercept TSS as shown in the System Controller column to the right of the image 3. As previously mentioned, the system controller 210 then utilizes this time to intercept TSS to generate a slew command as indicate by an arrow 302 that is applied to the system fine tracking system 208 which, in turn, controls a gimbal in the fine tracking system to rotate in response to the slew command to direct the a track sensor towards the determined angle and thereby toward the approaching missile 206.

At approximately this same time, the system controller 210 also provides the calculated time to intercept TSS as indicated by an arrow 304 to the handoff tracker processor 202. In addition to the angle of arrival information the missile warning system 204 provides to the system controller 210 as just discussed, at approximately this same time the missile warning system provides subimage location and along with the subimage including the identified threat 206 to the handoff tracker processor 202, as illustrated by an arrow 306. The handoff tracker processor 202 utilizes this subimage to perform an initial assessment of clutter and contrast in the scene. This assessment is done to determine a probability of a successful handoff to the fine tracking system 208 and to thereby determine if the handoff tracker processor 202 must perform feature recognition for such a successful handoff.

After this assessment, the handoff tracker processor 202 analyzes the subimage around the identified threat 206 to determine features that may be associated or "registered" to this threat, as indicated by an arrow 308 in the Handoff Tracker Processor column. This is a computationally intensive and iterative task, and therefore the handoff tracker processor 202 utilizes the time to intercept TSS value to determine the number of iterations to perform so that a solution will be available at the appropriate time. After the handoff tracker processor 208 has determined these features, processor uses these features and the sub-pixel location of the threat to register where the threat is with respect to the features, as indicated by an arrow 310. Thus, registering the features corresponds to identifying or defining where the threat is in relation to the identified features. Multiple registrations may be used for improved precision and robustness. The handoff tracker processor 202 stores this feature and registration information until the last image captured by the missile warning system 204 before the first image is acquired by the fine tracking system 208, as will be described in more detail below. Because it is less computationally intensive to update features and registrations on an image that does not greatly change (as in the case of an approaching missile at the early stages of its flight), this approach allows for much faster image processing and should make completion of processing possible before a new image arrives.

Using time to intercept TSS, it is possible to determine which captured image from the missile warning system 204 will be the last image that will be acquired before the first image from the fine tracking system 208 is acquired after movement of the fine track sensor and laser to the required angle of arrival via the applied slew command has been completed. This allows the quickest and most accurate handoff from the missile warning system 204 to the fine tracking system 208, as will be described in more detail below. In FIG. 3, this last image captured by the missile warning system 204 before the first image from the fine tracking system 208 corresponds to image 6, as indicated by the text to the left of this image.

At this point, the missile warning system 204 again sends sub-pixel location of the threat 206 and the subimage around the threat to the handoff tracker processor 312 as indicated by an arrow 312. Because the handoff tracker processor 202 can determine when handoff is to occur, the processor makes a final clutter and contrast determination on the just received image 6 from the missile warning system 204. If this new most recent image from the missile warning system 204 indicates that the threat 206 has a high contrast and that there is very little chance of clutter providing false threats to the fine tracking system 208, the fine tracker processor 202 applies signals indicated by arrow 314 to the fine tracking system that instruct the fine tracking system to acquire or track the threat normally and the engagement continues with essentially only the fine tracking system tracking the threat.

If the handoff tracker processor 202 determines from the image 6 that there is low threat contrast or there is the chance of clutter, the handoff tracker processor determines a track window to be utilized by the fine tracking system 208 in tracking the threat. When the handoff tracker processor 202 is to control target acquisition or tracking as in such low contrast or clutter situations, or simply as a parallel risk mitigation approach for the fine tracking system 208 in case problems arise in acquisition, the handoff tracker processor updates and determines for a final time image features and registration of such features for the threat 206, as indicated by arrows 316 and 318. As before, the handoff tracker processor 202 uses the determined features the sub-pixel location of the threat 206 to register where the threat is with respect to the features.

Figure 3:
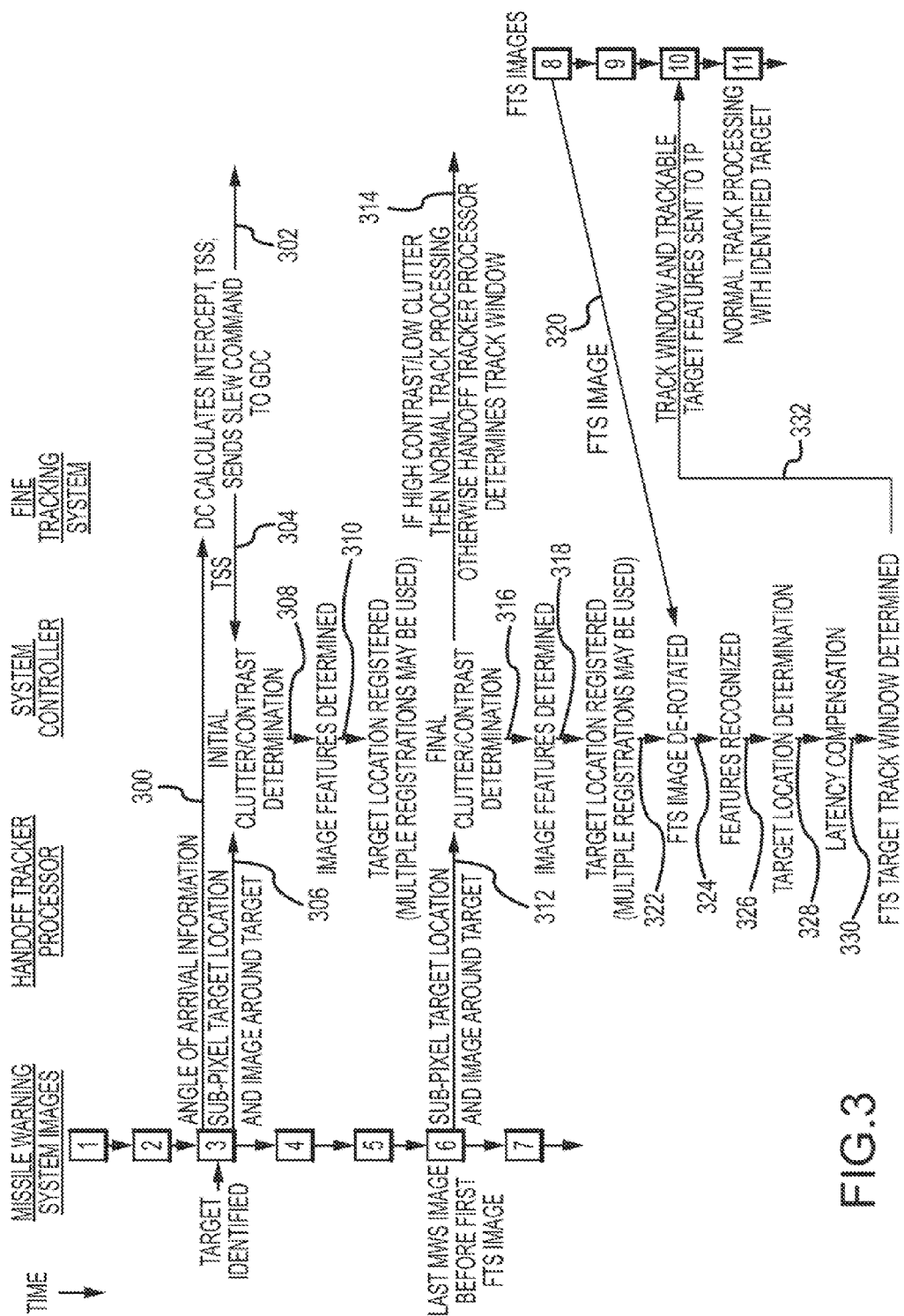
FIG. 3 is a time sequence of events diagram illustrating the operation of the components in the system of FIG. 2.

After the time to intercept TSS has elapsed, the fine tracking system 208 acquires a first image for this engagement as indicated by a box 8 in the far right column of FIG. 3. When the fine tracking system 208 is a two-axis moving mirror system with a fine track sensor or camera fixed in a base of a turret housing the system, the image acquired by the system is rotated as a result of gimbal movement. This rotation is a function of gimbal elevation and cross-elevation angles and may be determined by the handoff tracker processor 202 through multiple possible paths such that the processor can de-rotate the image 8 from the fine tracking system 208 for direct comparison with the subimage portion of the image 6 from the missile warning system 204. Rotating the image 8 from the fine tracking system 208 is the best approach since it has resolution an order of magnitude better than the image 6 from the missile warning system 204 and thus the image will suffer less from aliasing effects. An arrow 320 indicates the image 8 captured by the fine tracking system 208 being provided to the handoff tracker processor 202 and an arrow 322 indicates the operation of the handoff tracker processor in de-rotating this image.

The handoff tracker processor 208 thereafter compares the rotated image 8 to the stored subimage from the image 6 captured by the missile warning system 204 to identify features common to the rotated image 8 from the fine tracking system 208, as indicated by arrow 324. Using the registration features, the handoff tracker processor 202 determines the pixel location of the threat 206 within the rotated image 8 from the fine tracking system 208 as indicated by arrow 326. If necessary, the determined pixel location may be extrapolated to correspond with a current image from the fine tracking system 208. This can be done using platform and target motion history is available to the handoff tracker processor 202 through multiple possible paths, as will be appreciated by those skilled in the art.

Using the above information, the handoff tracker processor 202 then determines where in the rotated image from the fine tracking system the fine tracking system should position a track window and what target features are present for the fine tracking system to utilize to continue tracking the threat 206. Note that if position of the threat 206 is still indeterminate, the handoff tracker processor 202 may analyze multiple images such as images 9-11 to determine if the threat, through its relative motion, eventually separates itself from the clutter or background features already identified. This increases the time for handoff but with the benefit of improved handoff accuracy. Finally, as indicated by arrow 332 the handoff tracker processor 208 then provides the track window and threat tracking feature information to the fine tracking system 208 which, in turn, continues with normal tracking of the threat 206 using this information.

Figure 4:
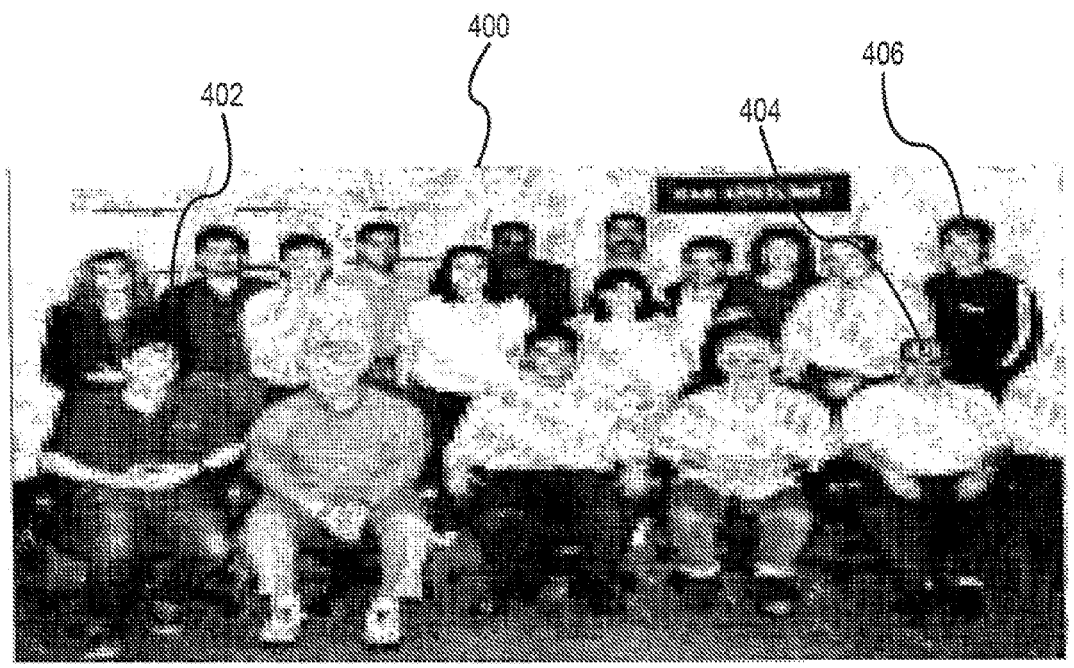
FIGS. 4-6 are images that represent images captured by the missile warning system and the handoff tracker processor in the directional infrared countermeasures system of FIG. 2 and that will now be used to further illustrate the operation of the directional infrared countermeasures system.
Figure 5:
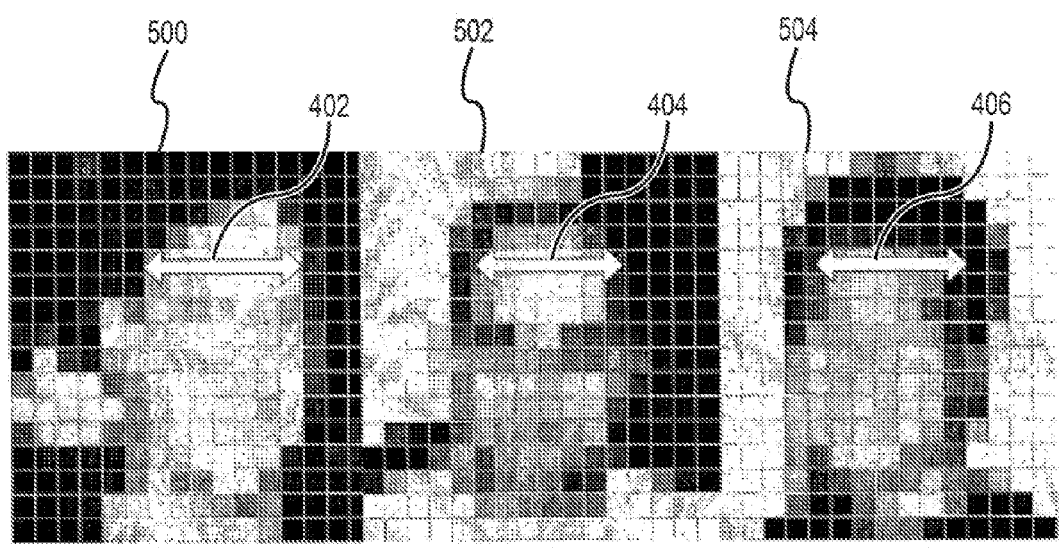
Figure 6:
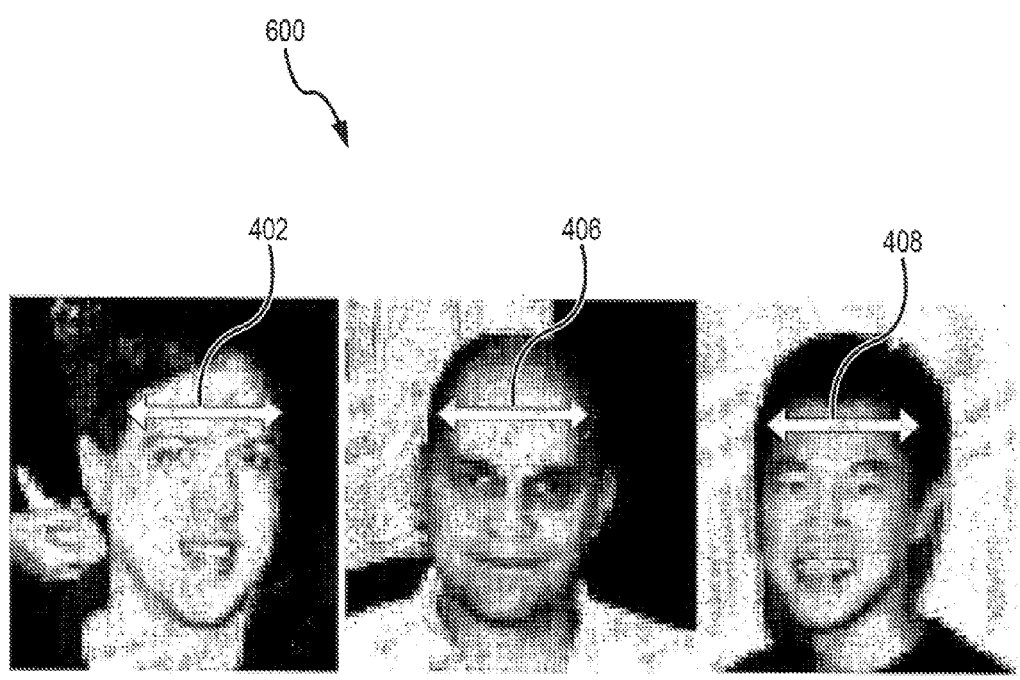

FIGS. 4-6 are images that represent images captured by the missile warning system 204 and the handoff tracker processor 202 of FIG. 2 and that will now be used to further discuss the operation of the system 200. FIG. 4 is a picture showing a sample image 400 captured by the missile warning system 204 of FIG. 2, with the sample image including three threats 402-406. FIG. 5 is a picture showing several sample subimages 500-504 of the image 400 of FIG. 4, with each subimage corresponding to a portion of the image 400 around the detected threats 402-406. The handoff track processor 202 analyzes these subimages 500-504 to register features in each subimage that are associated with the threats 402-406 identified in the subimage. Note the subimages 500-504 are portions or zoomed in areas of the image 400 and accordingly the subimages have the same resolution as the image 400. The handoff tracker processor 202 augments the location of the threat 402-406 from the missile warning system 204 based upon the image 400 by defining position of the threat in pixel space corresponding to a subimage 500-504 with reference to "registration" features in the subimage. In the single image 400 the locations of threats 402-406 may have very little contrast from the surrounding or background area and are not necessarily the brightest items in the image. The registration of features in the subimages 500-504, however, allow the threats 402-406 to be referenced to high contrast features for subsequent tracking.

FIG. 6 is a picture showing a sample initial image 600 captured by the fine tracking system 208 of FIG. 2 and the threats 402-406 within that image. This image represents the scene at the start of handoff and while the pixel resolution is much finer, there are still no inherent cues as to the location of threats. Without augmentation or processing many images (and thus delaying threat defeat), handoff is not possible. Using the augmentation of defining the threat location with respect to the high contrast features, however, enables the fine tracking system 208 to determine the location of a threat in a single image.

In one embodiment, several components of the directional infrared countermeasures system 200 of FIG. 2 correspond to components in a Defensive Avionics Receiver Transmitter (DART™) system, which is a directional infrared countermeasure system manufactured by BAE Systems Information and Electronic Systems Integration Inc.

One skilled in the art will understood that even though various embodiments and advantages of the present invention have been set forth in the foregoing description, the above disclosure is illustrative only, and changes may be made in detail, and yet remain within the broad principles of the invention. For example, many of the components described above may be implemented using either digital or analog circuitry, or a combination of both, and also, where appropriate, may be realized through software executing on suitable processing circuitry. It should also be noted that the functions performed by the components 202-210 in the system 200 of FIG. 2 can be combined to be performed by fewer elements and divided and performed by more elements, depending the application of the system and other factors as well. Therefore, the present invention is to be limited only by the appended claims.

What is claimed is:

1. A method for identifying threats, comprising:
   capturing at least one low-resolution image within a wide field of view;
   identifying a threat from the captured low-resolution image or images;
   determining angle of arrival information of the identified threat;
   determining time to intercept information from the determined angle of arrival information;
   identifying features surrounding the threat;
   registering these features with the threat;
   capturing a subsequent low-resolution image where the time at which the subsequent low-resolution image is captured is determined by the time to intercept information;

capturing a high-resolution image within a narrow field of view; and identifying a location of a threat within this captured high-resolution image using the registered features of the subsequent low-resolution image.

2. The method of claim 1 wherein the operations of capturing at least one low-resolution image and capturing a high-resolution image include sensing infrared or ultraviolet radiation emitted from the threat.

3. The method of claim 1 wherein identifying the threat from the captured low-resolution image or images comprises processing a sequence of captured low-resolution images to identify the threat.

4. The method of claim 1 wherein identifying a threat from the captured low-resolution image or images comprises analyzing a subimage of the captured lower-resolution image, with the subimage including the threat.

5. The method of claim 4 wherein the method further comprises:
  determining a contrast between the threat and a background portion of the subimage; and
  when the contrast is greater than a threshold level, identifying a location of the threat within the captured high-resolution image without the use of the registered features.

6. The method of claim 1 wherein the method further includes performing countermeasures on the threat identified within the captured high-resolution image.

7. The method of claim 6 wherein performing countermeasures includes illuminating the threat with modulated infrared radiation.

8. A method for identifying threats, comprising:
  capturing at least one low-resolution image within a wide field of view;
  identifying a threat from the captured low-resolution image or images;
  determining angle of arrival information of the identified threat;
  determining time to intercept information from the determined angle of arrival information;
  processing an initial subimage from one of the low-resolution images to identify features surrounding the threat and to register these features with the threat, wherein this processing operation includes of number of iterations to identify the features and register these features and the number of iterations is a function of the determined time to intercept information;
  capturing a final low-resolution image within the wide field of view;
  processing a second subimage of the final low-resolution image to identify features surrounding the threat and to register these features with the threat, wherein the low-resolution image corresponding to the final low-resolution image is determined by the time to intercept information;
  capturing an initial high-resolution image within a narrow field of view;
  derotating the initial high-resolution image;
  comparing the derotated initial high-resolution image to the second subimage of the final low-resolution image; and
  determining a track window from the operation of comparing to thereby identify a location of the threat within the initial captured high-resolution image.

9. The method of claim 8, wherein comparing the derotated initial high-resolution image to the second subimage of the final low-resolution image and determining a track window from the operation of comparing to thereby identify a location of the threat within the initial captured high-resolution image further comprise:
  identifying features common to the derotated initial high-resolution image and the second subimage;
  registering the identified features;
  determining the pixel location of the threat within the derotated initial high-resolution image;
  determining the location of the track window in the derotated initial high-resolution image; and
  identifying the features to be used for continued tracking of the threat in subsequently captured high-resolution images.

10. The method of claim 8, wherein the operations of capturing include sensing infrared or ultraviolet radiation emitted from the threat.

11. The method of claim 8, wherein identifying the threat from the captured low-resolution image or images comprises processing a sequence of captured low-resolution images to identify the threat.

12. The method of claim 8 further comprising performing countermeasures on the threat identified within the captured initial high-resolution image.

13. The method of claim 12 wherein performing countermeasures includes illuminating the threat with modulated infrared radiation.

* * * * *